United States Patent
Zapf et al.

(10) Patent No.: US 10,301,996 B2
(45) Date of Patent: May 28, 2019

(54) SYSTEM AND METHOD FOR VARYING REDUCTANT DELIVERY PRESSURE TO AFTERTREATMENT SYSTEMS

(71) Applicant: Cummins Emission Solutions Inc., Columbus, IN (US)

(72) Inventors: Friedrich J. Zapf, Karlstadt (DE); Stephen M. Holl, Columbus, IN (US); John D. Crofts, Edinburgh, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 83 days.

(21) Appl. No.: 14/878,353

(22) Filed: Oct. 8, 2015

(65) Prior Publication Data
US 2017/0101913 A1 Apr. 13, 2017

(51) Int. Cl.
*F01N 3/20* (2006.01)
*F01N 3/28* (2006.01)

(52) U.S. Cl.
CPC ........... *F01N 3/208* (2013.01); *F01N 3/2066* (2013.01); *F01N 3/28* (2013.01); *F01N 2410/00* (2013.01); *F01N 2610/02* (2013.01); *F01N 2610/144* (2013.01); *F01N 2610/1473* (2013.01); *F01N 2900/0408* (2013.01); *F01N 2900/1808* (2013.01)

(58) Field of Classification Search
CPC .............................................. F01N 2900/1808
See application file for complete search history.

(56) References Cited

U.S. PATENT DOCUMENTS

| 8,474,244 B2 | 7/2013 | Duret et al. | |
|---|---|---|---|
| 9,458,754 B2* | 10/2016 | Everard | F01N 3/208 |
| 9,822,686 B2* | 11/2017 | Liljestrand | F01N 3/208 |
| 2008/0264043 A1* | 10/2008 | Kawakita | F01N 3/2066 |
| | | | 60/286 |
| 2011/0023466 A1* | 2/2011 | Branco | B01D 53/90 |
| | | | 60/286 |
| 2013/0269418 A1* | 10/2013 | Peucat | F01N 3/208 |
| | | | 73/37 |
| 2014/0047820 A1 | 2/2014 | Hu et al. | |
| 2015/0260069 A1* | 9/2015 | Dea | F01N 3/208 |
| | | | 60/274 |
| 2017/0089243 A1* | 3/2017 | Schmitt | F01N 3/035 |

FOREIGN PATENT DOCUMENTS

CN 202789025 U 3/2013

* cited by examiner

*Primary Examiner* — Binh Q Tran
(74) *Attorney, Agent, or Firm* — Foley & Lardner LLP

(57) ABSTRACT

An aftertreatment system comprises a reductant storage tank and a SCR system including a catalyst for reducing constituents of an exhaust gas. A reductant insertion assembly is fluidly coupled to the reductant storage tank and the SCR system. A controller is communicatively coupled to the reductant insertion assembly. The controller is configured to: determine an initial pressure of the reductant, determine a first pressure at which the reductant is to be delivered to the selective catalytic reduction system and adjust an operating parameter of the reductant insertion assembly. The adjustment of the operating parameter results in an at least selective delivery of the reductant at the first pressure to the SCR system.

18 Claims, 7 Drawing Sheets

SYSTEM AND METHOD FOR VARYING REDUCTANT DELIVERY PRESSURE TO AFTERTREATMENT SYSTEMS

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert NOx (NO and $NO_2$ in some fraction) into harmless nitrogen gas ($N_2$) and water vapor ($H_2O$) in the presence of ammonia ($NH_3$). Generally in such conventional aftertreatment systems, an exhaust reductant, (e.g., a diesel exhaust fluid such as urea) is injected into the aftertreatment system to provide a source of ammonia, and mixed with the exhaust gas to partially reduce the NOx gases. The reduction byproducts of the exhaust gas are then fluidically communicated to the catalyst included in the SCR aftertreatment system to decompose substantially all of the NOx gases into relatively harmless byproducts which are expelled out of such conventional SCR aftertreatment systems.

An exhaust reductant is generally inserted into the SCR system as the source of ammonia to facilitate the reduction of constituents such as NOx gases of the exhaust gas (e.g., a diesel exhaust gas). The exhaust reductant is stored in a reductant storage tank and communicated to the SCR system. The reductant generally includes an aqueous solution such as an aqueous urea solution. Reductant insertion assemblies are generally used to deliver the reductant from the reductant storage tank.

The urea or any other source of ammonia inserted into aftertreatment system can be deposited on sidewalls and/or components of the aftertreatment system. The amount and rate of reductant deposits in the aftertreatment system can be a function of the pressure at which the reductant is inserted into the aftertreatment system and/or any other parameters which can affect efficient mixing of the reductant with the exhaust gas. Increases in reductant deposits can lead to inefficient mixing of the exhaust gas with the reductant, variations in temperature of the exhaust gas and/or increase in backpressure experienced by the exhaust gas flowing through the aftertreatment system, all of which can negatively impact a catalytic conversion efficiency of the aftertreatment system.

SUMMARY

Embodiments described herein relate generally to systems and methods of varying a pressure of a reductant inserted into an aftertreatment system and in particular, to adjusting the reductant insertion pressure by adjusting an operating parameter of a reductant insertion assembly fluidly coupled to the engine.

In a first set of embodiments, an aftertreatment system comprises a reductant storage tank and a SCR system including a catalyst for reducing constituents of an exhaust gas. A reductant insertion assembly is fluidly coupled to the reductant storage tank and the SCR system. A controller is communicatively coupled to the reductant insertion assembly. The controller is configured to determine an initial pressure of the reductant, determine a first pressure at which the reductant is to be delivered to the selective catalytic reduction system and adjust an operating parameter of the reductant insertion assembly. The adjustment of the operating parameter results in at least selective delivery of the reductant at the first pressure to the SCR system.

In another set of embodiments, a system for controlling the pressure of a reductant delivered to an aftertreatment system from a reductant storage tank comprises a reductant insertion assembly configured to be fluidly coupled to each of the reductant storage tank and the aftertreatment system. A control module is communicatively coupled to the reductant insertion assembly. The control module comprises a controller configured to determine an initial pressure of the reductant, determine a first pressure at which the reductant is to be delivered to the aftertreatment system and adjust an operating parameter of the reductant insertion assembly. The adjustment of the operating parameter results in an at least selective delivery of the reductant at the first pressure to the aftertreatment system.

In yet another set of embodiments, a method of delivering a reductant to an aftertreatment system using a reductant insertion assembly which includes a pump, a pressure sensor and a dosing valve, and is fluidically coupled to the aftertreatment system comprises determining a first pressure at which the reductant is to be delivered to the aftertreatment system. An initial output value of the pressure sensor is interpreted which is indicative of an initial pressure of the reductant at the dosing valve. A first output value of the pressure sensor is determined. The first output value corresponds to the first pressure. An operating speed of the pump is adjusted until the output value of the pressure sensor is equal to the first output value. The dosing valve is activated which results in an at least selective delivery of the reductant to the aftertreatment system at the first pressure.

In still another set of embodiments, an apparatus is provided. A control module is configured to be communicatively coupled to a reductant insertion assembly. The control module comprises a pressure determining module configured to: determine an initial pressure of reductant to be delivered to an aftertreatment system from a reductant storage tank via the reductant insertion assembly, and determine a first pressure at which the reductant is to be delivered to the aftertreatment system. The control module also includes an adjusting module configured to adjust an operating parameter of the reductant insertion assembly. The adjustment of the operating parameter results in an at least selective delivery of the reductant at the first pressure to the aftertreatment system.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
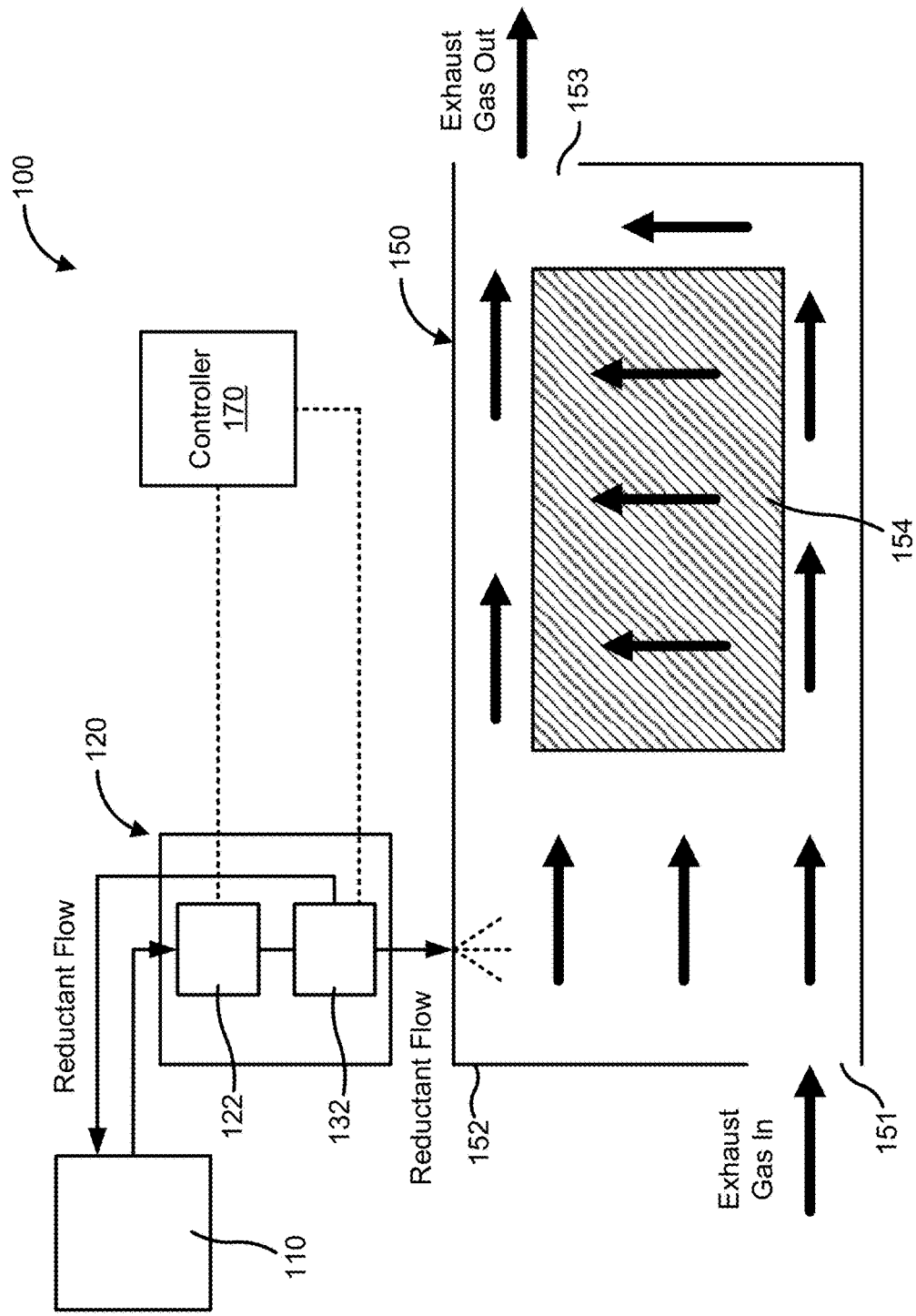
FIG. 1 is a schematic illustration of an aftertreatment system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods of varying a pressure of a reductant inserted into an aftertreatment system and in particular, to adjusting the reductant insertion pressure by adjusting an operating parameter of a reductant insertion assembly fluidly coupled to the engine.

Traditional reductant insertion assemblies included in aftertreatment systems are configured to insert a reductant into the aftertreatment system at a fixed insertion pressure. However, this has drawbacks as the fixed insertion pressure may not provide the optimal mixing of the reductant with the exhaust gas at varying exhaust gas flow conditions such as flow rates and temperature. For example, at a low flow rate and/or temperature (e.g., during idling of an engine producing the exhaust gas) it may be beneficial to insert the reductant at a relatively lower momentum by modifying, varying or adjusting an operating pressure of the pump (e.g., a different pressure than the fixed pressure which can be a higher or a lower pressure than the fixed pressure). Lower droplet momentum can provide better mixing of the reductant with the exhaust gas and prevent impingement of the reductant on the sidewalls of the aftertreatment system thereby, reducing reductant deposits. In contrast, at a high flow rate and/or exhaust gas temperature (e.g., during high load conditions) it may be beneficial to insert the reductant at a higher momentum relative to a normal flow rate and/or exhaust gas temperature (e.g., during steady-state operating conditions) to provide optimal mixing.

Various embodiments of the systems and methods described herein for adjusting the pressure of a reductant inserted into an aftertreatment system may provide benefits including, for example: (1) using a relatively small pressure for inserting small amounts of reductant into the aftertreatment system, which may lead to a better ratio between maximum and minimum insertion amounts with relatively higher accuracy; (2) allowing adjustment of pressure at low exhaust gas flow velocity to avoid impingement of inserted reductant on the sidewalls of the aftertreatment system, thereby promoting mixing and reducing deposits; (3) allowing varying of the pressure to avoid cool down of sidewalls or otherwise components of the aftertreatment system by preventing constant impingement of the reductant thereon, thereby avoiding forming of deposits in relatively cold conditions; (4) facilitating distribution and mixing of reductant with the exhaust gas by allowing varying the insertion pressure of the reductant; and (5) allowing better control of reductant droplet size and droplet velocity for variations in the mass of the exhaust gas and/or the exhaust gas temperature.

FIG. 1 is a schematic illustration of an aftertreatment system 100, according to an embodiment. The aftertreatment system 100 is configured to receive an exhaust gas (e.g., a diesel exhaust gas) from an engine (e.g., a diesel engine) and reduce constituents of the exhaust gas such as, for example, NOx gases, CO, etc. The aftertreatment system 100 includes a reductant storage tank 110 (also referred to herein as "tank 110"), a reductant insertion assembly 120, a SCR system 150 and a controller 170.

The tank 110 contains an exhaust reductant formulated to facilitate reduction of the constituents of the exhaust gas (e.g., NOx) by a catalyst 154 included in the SCR system 150. In embodiments in which the exhaust gas is a diesel exhaust gas, the exhaust reductant can include a diesel exhaust fluid (DEF) which provides a source of ammonia. Suitable DEFs can include urea, aqueous solution of urea or any other DEF (e.g., the DEF available under the tradename ADBLUE®).

The SCR system 150 is configured to receive and treat the exhaust gas (e.g., a diesel exhaust gas) flowing through the SCR system 150. The SCR system 150 is fluidly coupled to the tank 110 to receive the reductant from the tank 110 via the reductant insertion assembly 120, as described herein. The SCR system 150 includes a housing 152 defining an inlet 151 for receiving the exhaust gas from an engine (e.g., a diesel IC engine), and an outlet 153 for expelling treated exhaust gas. The SCR system 150 includes at least one catalyst 154 positioned within an internal volume defined by the housing 152. The catalyst 154 is formulated to selectively reduce constituents of the exhaust gas, for example NOx included in the exhaust gas in the presence of an exhaust reductant. Any suitable catalyst 154 can be used such as, for example, platinum, palladium, rhodium, cerium, iron, manganese, copper, vanadium based catalysts (including combinations thereof).

The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials can include, for example, aluminum oxide, titanium dioxide, silicon dioxide, any other suitable washcoat material, or a combination thereof. The exhaust gas can flow over and about the catalyst 154 such that any NOx gases included in the exhaust gas are further reduced to yield an exhaust gas which is substantially free of carbon monoxide and NOx gases.

The reductant insertion assembly 120 is fluidly coupled to the tank 110 and the SCR system 150 and is configured to insert the reductant into the SCR system 150 from the tank 110. The reductant insertion assembly 120 can include any suitable reductant insertion or reductant dosing system configured to deliver metered amounts of reductant into the SCR system 150. Such a system can include, for example pumps, valves, nozzles, conduits or pipes or any other components to facilitate insertion of the reductant into the SCR system 150.

The reductant insertion assembly 120 is configured to insert the reductant at varying pressures into the SCR system 150. The pressure of the reductant inserted into the SCR system 150 may be adjusted based on flow conditions of the exhaust gas flowing through the aftertreatment system 100, as described above. The reductant insertion assembly 120 is configured to adjust the pressure of the reductant inserted into the SCR system 150 based on a flow condition of the exhaust gas, thereby providing optimal mixing of the reductant with the exhaust gas at any flow condition (e.g., flow rate and/or temperature) of the exhaust gas.

The controller 170 is communicatively coupled to the reductant insertion assembly 120. The controller 170 is configured to determine an initial pressure of the reductant. For example, the controller 170 can determine an initial pressure at which the reductant is being inserted into the SCR system 150 at an initial time. The initial pressure can, for example, correspond to an initial flow condition of the exhaust gas at the initial time, for example an exhaust gas flow rate, temperature and/or concentration of the one more constituents (e.g., NOx gases) included in the exhaust gas at the initial time. In one embodiment, the initial pressure of the reductant inserted into the exhaust gas can correspond to a steady state flow condition of the exhaust gas which corresponds to the engine which produces the exhaust gas operating at a steady state operating condition.

The controller 170 determines a first pressure at which the reductant is to be delivered to the SCR system 150, i.e., inserted into the exhaust gas flowing through the SCR system 150. For example, the first pressure can correspond to a first flow condition of the exhaust gas which is different from the initial flow condition of the exhaust gas to provide optimal mixing and reduce reductant deposits. In one embodiment, the first pressure can correspond to low load or idling flow condition of the exhaust gas corresponding to the engine producing the exhaust gas operating at the low load or idling condition. In such circumstances, the flow rate and/or temperature of the exhaust gas may be lower than the flow rate or temperature of the exhaust gas at the steady state condition so that the first pressure, which is expected to provide optimal mixing of the reductant with the exhaust gas, is different than the initial pressure (e.g., a higher or lower than the initial pressure), for example to provide a lower momentum of reductant droplets inserted into the SCR system 150.

In another embodiment, the first pressure can correspond to high load flow condition of the exhaust gas produced corresponding to the engine operating at a high load condition. In such circumstances, the flow rate and/or temperature of the exhaust gas may be higher than the flow rate or temperature of the exhaust gas at the steady state condition so that the first pressure for providing optimal mixing of the reductant with the exhaust gas, is different than the initial pressure different (e.g., a higher or lower than the initial pressure), for example to provide a higher momentum of reductant droplets inserted into the SCR system 150. In particular embodiments, the first pressure is in the range of 6 bar to 14 bar inclusive of all ranges and values therebetween.

Although not shown in FIG. 1, the aftertreatment system 100 can include sensors such as, for example, temperature sensors, pressure sensors, NOx sensors, oxygen sensors, ammonia sensors and/or any other sensors. The controller 170 may be communicatively coupled to one or more such sensors to receive and interpret signals from one or more of these sensors. The controller 170 may use the information from one or more of these sensors to determine the flow condition of the exhaust gas, and therefrom the first pressure. In other embodiments, the controller 170 is communicatively coupled to the engine producing the exhaust gas to determine an operating condition of the engine (e.g., steady state load, high load, low load, rich condition, lean condition, etc.). The controller 170 uses the operating condition of the engine to determine a flow condition of the exhaust gas and therefrom, the first pressure.

The controller 170 is configured to adjust an operating parameter of the reductant insertion assembly 120. The adjustment of the operating parameter results in an at least selective delivery of the reductant at the first pressure to the SCR system 150. For example, the controller 170 can adjust an operating speed of a pump included in the reductant insertion assembly 120, a temperature of the reductant in the reductant insertion assembly 120, a width of a nozzle of the reductant insertion assembly 120 which inserts the reductant into the SCR system 150 or any other operational parameter of the reductant insertion assembly 120 to achieve the delivery of the reductant into the SCR system 150 at the first pressure.

In a particular embodiment, the reductant insertion assembly 120 can include a supply unit 122 and a dosing unit 132. The supply unit 122 includes a pump (e.g., the pump 224 included in the supply unit 222 of the reductant insertion assembly 220 described below) fluidly coupled to the tank 110. The pump can include a centrifugal pump, a diaphragm pump, a valve pump, a screw pump or any other suitable pump. In particular embodiments, the supply unit 122 can also include a pressure relief valve configured to allow at least a portion of the reductant from downstream of the pump to flow upstream of the pump if a reductant pressure generated by the pump exceeds a predetermined threshold.

The pump is configured to draw the reductant form the tank 110 and pump the liquid at a predetermined pressure (e.g., the initial pressure or the first pressure) to the SCR system 150 via the dosing unit 132. In such embodiments, the operating parameter of the reductant insertion assembly 120 is the operating speed of the pump. The operating speed of the pump is varied to allow varying of the pressure of the reductant inserted into the SCR system 150. For example, an operational voltage at which the pump is operated is varied to adjust the operating speed of the pump and thereby, the insertion pressure of the reductant.

The dosing unit 132 includes a pressure sensor and a dosing valve (e.g., the pressure sensor 234 and the dosing valve 236 included in the dosing unit 232 of the reductant insertion 220 described below). An output of the pressure sensor (e.g., an output signal or a pressure value) can be used to determine the insertion pressure of the reductant i.e., the initial pressure, the first pressure or any other pressure.

Moreover, the pressure sensor can be operatively coupled to the pump or the controller 170 in a feedback loop to so that the output of the pressure sensor can be used to adjust the operating speed of the pump to deliver the reductant at a desired pressure (e.g., the first pressure) into the SCR system 150.

In various embodiments, the dosing unit 132 can include the dosing unit 332 described below. The dosing valve is fluidly coupled to the SCR system 150 and configured to insert the reductant received from the pump included in the supply unit 122 into the SCR system 150. For example, the dosing valve can include or be fluidly coupled to a nozzle which is in fluid communication with the SCR system 150. The dosing valve 132 can comprise a solenoid valve, a plate valve, a diaphragm valve or any other suitable valve which can be selectively activated to insert the reductant into the SCR system 150 at the first pressure.

In one embodiment, the dosing unit 132 comprises a solenoid, a valve needle seated in a valve seat and a nozzle. In such embodiments, activating the dosing valve includes activating the solenoid so as to move the valve needle distal from the valve seat so that the reductant can be pumped through the nozzle. In particular embodiments, the dosing unit 132 also includes an orifice in fluid communication with the tank 110. The orifice is configured to allow excess reductant to be delivered back to the tank 110 from the dosing unit 132.

In various embodiments, the controller 170 is communicatively coupled to each of the supply unit 122 and the dosing unit 132. The controller 170 is configured to interpret an initial output value of the pressure sensor which is indicative of the initial pressure of the reductant at the dosing valve. As described previously, the initial pressure can correspond to a pressure or the reductant which provides optimal mixing of the reductant with the exhaust gas during steady state flow condition of the exhaust gas.

The controller 170 determines a first output value of the pressure sensor corresponding to the first pressure. As described above, the first pressure corresponds to a desired insertion pressure of the reductant at which optimal mixing of the reductant with the exhaust gas as well as reduction in reductant deposits is expected. The controller 170 adjusts the operating speed of the pump until the output value of the pressure sensor is equal to the first output value. For example, the controller 170 varies the operating voltage of the pump to reduce or increase the speed until the pressure of the reductant as measured by the pressure sensor is the same or otherwise substantially the same (i.e., within ±90% of the first pressure). The controller 170 then activates the dosing valve which results in an at least selective delivery of the reductant to the SCR system 150 at the first pressure.

In some embodiments, the controller 170 is further configured to maintain the dosing valve activated for a first time so as to deliver a first amount of reductant to the SCR system 150. In other words, the controller 170 maintains the dosing valve open until the first amount of the reductant is delivered to the SCR system 150 at the first pressure. The operating speed of the pump, and thereby the insertion pressure of the reductant, can be varied over numerous cycles.

For example, the controller 170 can be configured to determine a second pressure at which the reductant is to be delivered to the aftertreatment system. The second pressure is different from the first pressure. Expanding further, the controller 170 can determine a change in the operating flow condition of the exhaust gas from the first flow condition (e.g., a low load flow condition) to a second flow condition (e.g., a high load flow condition). The controller 170 can then determine the second pressure at which the reductant inserted into the SCR system 150 will cause optimal mixing of the reductant with the exhaust gas, thereby reducing reductant deposits.

The controller 170 determines a second output value of the pressure sensor corresponding to the second pressure. For example, the controller can determine a voltage, a current, a capacitance, an inductance or any other suitable output value or otherwise output signal of the pressure sensor which corresponds to the second pressure. The controller 170 can include lookup tables, algorithms, pressure/output signal curves or maps to determine the second output value which corresponds to the second pressure.

The controller 170 adjusts the operating speed of the pump until the output value of the pressure sensor is equal to the second output value, thereby adjusting pressure of the reductant to the second pressure. The controller 170 activates the dosing valve which results in an at least selective delivery of the reductant to the SCR system 150 at the second pressure. The controller 170 can maintain the dosing valve activated for a second time to allow a second amount of reductant to be delivered to the SCR system 150.

The controller 170 can include a processor (e.g., a microcontroller) programmed to interpret the output signal. In some embodiments, the controller 170 can be included in a control module (e.g., the control module 270 described herein) which is in electrical communication one or more of the components of the aftertreatment system 100 described herein and operable to perform the sensing and control functions described herein. In particular embodiments, the controller 170 can also be configured to receive and interpret data from, temperature sensors, NOx sensors, oxygen sensors and/or ammonia sensors, each of which can be included in the aftertreatment system 100, as described before.

Figure 2:
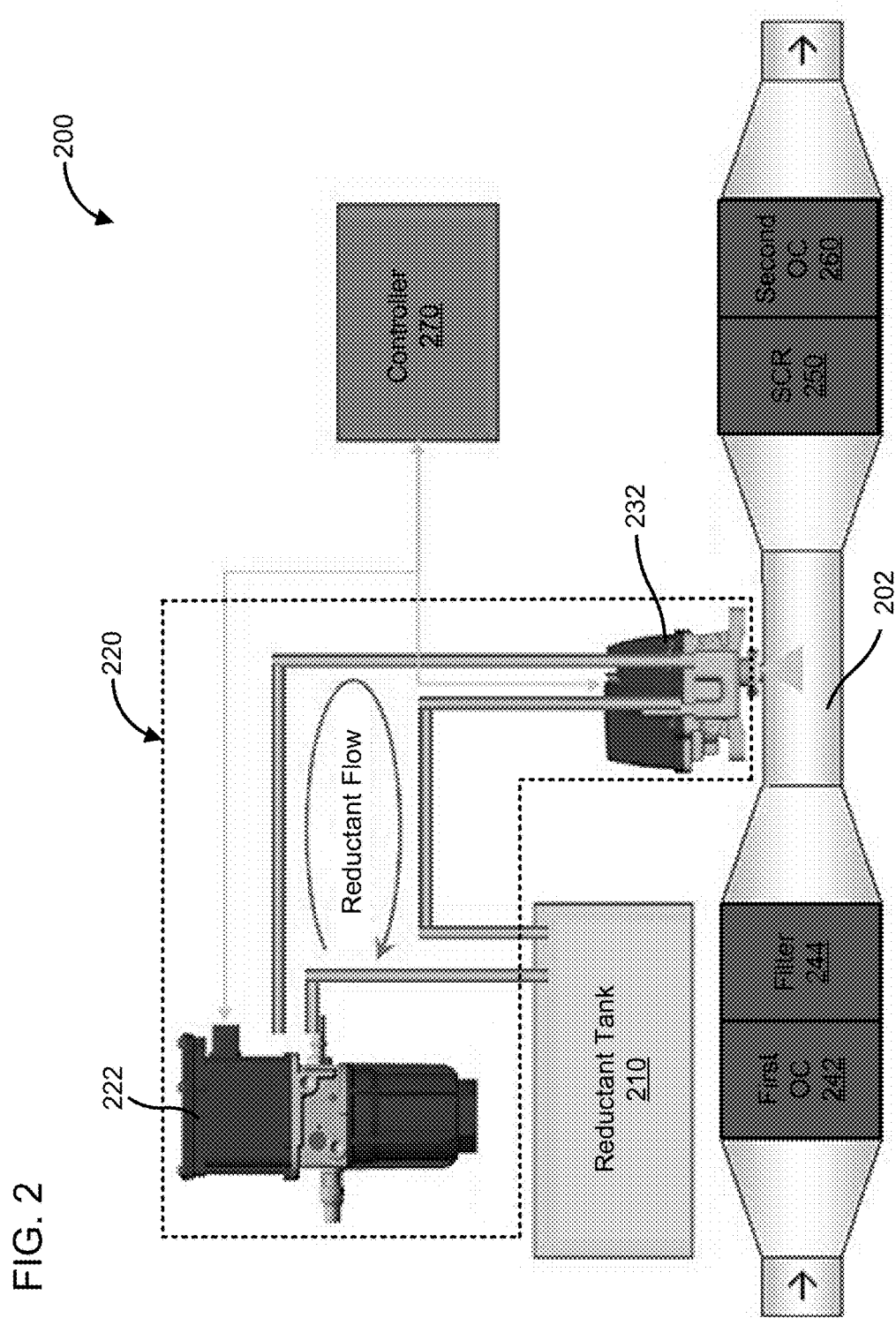
FIG. 2 is an illustration of another embodiment of an aftertreatment system.

FIG. 2 shows another embodiment of an aftertreatment system 200. The aftertreatment system 200 includes a reductant storage tank 210, a reductant insertion assembly 220, a first oxidation catalyst 242, a filter 244, an SCR system or SCR catalyst 250, a second oxidation catalyst 260 and a controller 270. The aftertreatment system 200 is configured to receive an exhaust gas from an engine (e.g., a diesel IC engine) and decompose constituents (e.g., NOx gas included in the exhaust gas) and includes a housing 202 within which the first oxidation catalyst 242, the filter 244, the SCR catalyst 250 and the second oxidation catalyst 260 are positioned.

The reductant storage tank 210 (also referred to herein as the "tank 210") contains a reductant, for example a diesel exhaust fluid. The reductant facilitates decomposition of the constituents (e.g., NOx gases) of the exhaust gas. The tank 210 can be substantially similar to the tank 110 described with respect the aftertreatment system 100, and therefore not described in further detail herein.

The SCR catalyst 250 is configured to receive and treat the exhaust gas (e.g., a diesel exhaust gas) flowing through the SCR catalyst 250. The SCR catalyst 250 is fluidly coupled to the tank 210 to receive the reductant from the storage tank 210 via the reductant insertion assembly 220, as described herein. The SCR catalyst 250 can be substantially similar to the SCR system 150 including the catalyst 154 described with respect the aftertreatment system 100, and therefore not described in further detail herein.

The first oxidation catalyst 242 is positioned upstream of the SCR catalyst 250. In various embodiments, the first oxidation catalyst 242 can include a diesel oxidation catalyst configured to reduce CO and unburnt hydrocarbons included in the exhaust gas. The filter 244 is positioned downstream of the first oxidation catalyst 242 and upstream of the SCR catalyst 250. The filter 244 can include a particulate matter filter configured to filter particulate matter (e.g., soot, carbon, dust, any other organic or inorganic particles) entrained in the exhaust gas to an acceptable range. In some embodiments, the filter 244 can include a diesel particulate filter which can, for example, be catalyzed. The second oxidation catalyst 260 is positioned downstream of the SCR catalyst 250. The second oxidation catalyst 260 can include, for example an ammonia catalyst or other slip catalyst configured to decompose any ammonia (decomposition by product of the reductant) which remains in the exhaust gas downstream of the SCR catalyst 250.

The reductant insertion assembly 220 is fluidly coupled to the tank 210 and the housing 202 and configured to draw the reductant from the tank 210 and insert the reductant into the housing 202 upstream of the SCR catalyst 250 or into the SCR catalyst 250. The reductant insertion assembly 220 includes a supply unit 222 and a dosing unit 232, which are fluidly coupled to each other and configured to insert the reductant into the housing 202 of the aftertreatment system 200.

Figure 3:
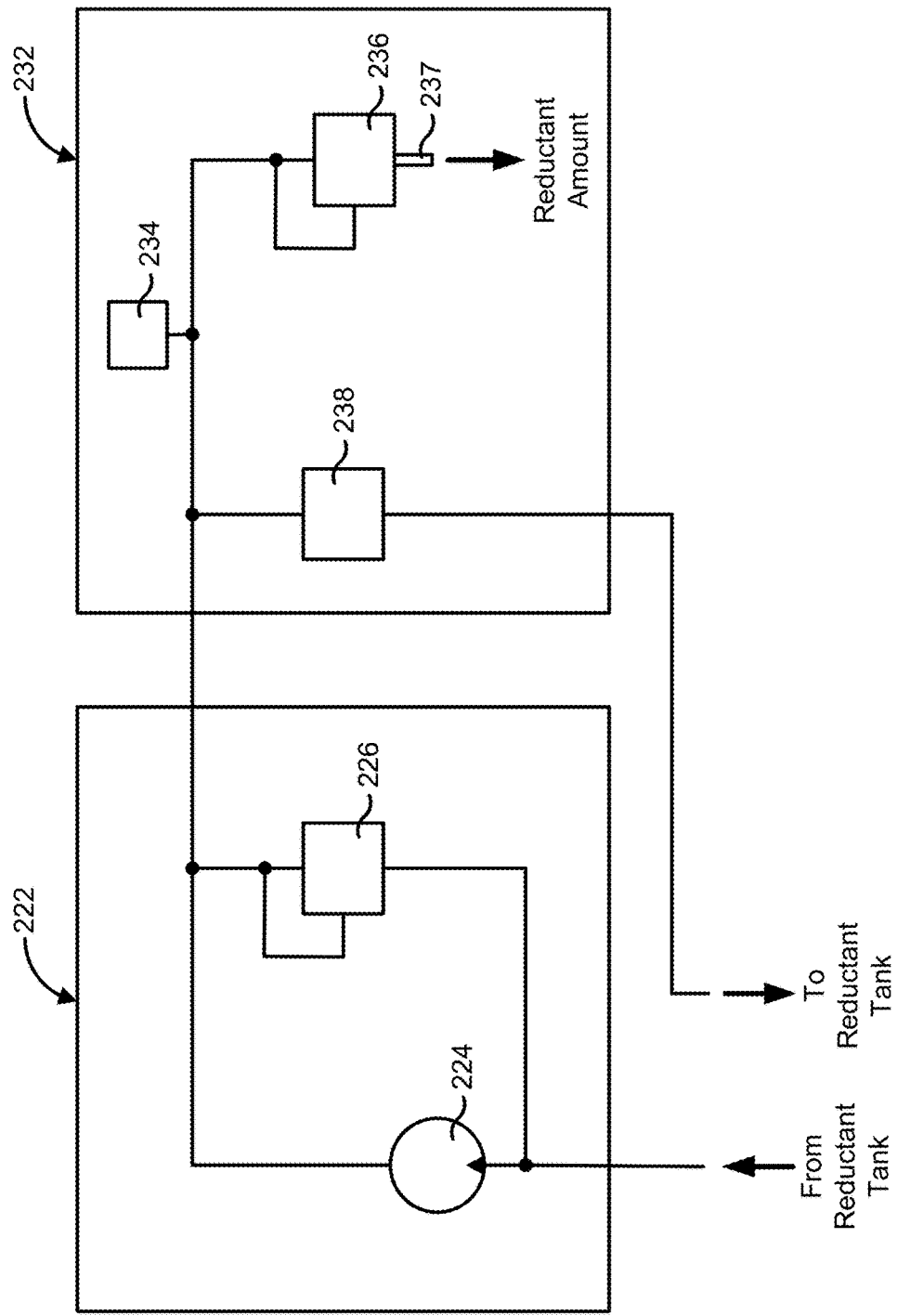
FIG. 3 is a schematic block diagram of a fluidic circuit of a supply unit and a dosing unit included in a reductant insertion assembly, which is included in the aftertreatment system of FIG. 2.

FIG. 3 is a schematic block diagram of the components and fluidic circuit of the reductant insertion assembly 220. As shown in FIG. 3, the supply unit 222 includes a pump 224 fluidly coupled to the tank 210. The pump 224 can include a centrifugal pump, a diaphragm pump, a valve pump, a screw pump or any other suitable pump. The pump 224 is configured to draw the reductant from the tank 210 and pump the liquid at a predetermined pressure (e.g., an initial pressure or first pressure as described with respect to the aftertreatment system 100) to the SCR catalyst 250 via the dosing unit 232. The operating speed of the pump 224 is varied to allow varying of the pressure of the reductant inserted into the housing 202. For example, an operational voltage at which pump 224 is operated is varied to adjust the operating speed and thereby, the insertion pressure of the reductant inserted into the housing 202.

The supply unit 222 also includes a pressure relief valve 226. The pressure relief valve 226 is configured to allow at least a portion of the reductant from downstream of the pump 224 to flow upstream of the pump 224 if a reductant pressure generated by the pump 224 exceeds a predetermined threshold. In other words, the pressure relief valve 226 prevents the pressure of the reductant in the fluidic circuit of the reductant insertion assembly 220 generated by the pump 224 from exceeding a predetermined pressure by allowing at least a portion of the reductant to be diverted via the pressure relief valve 226 to a location upstream of the pump 224. In other embodiments, any other device can be positioned in series with the pressure relief valve 226 or used in place of the pressure relief valve 226. For example, the supply unit 222 can include a torque limiting device for limiting the torque generated by the pump 224 (e.g., a motor of the pump 224).

The dosing unit 232 includes a dosing valve 236 which is fluidly coupled to the housing 202 or otherwise the aftertreatment system 200. A pressure sensor 234 is positioned downstream of the pump 224 and upstream of the dosing valve 236, for example fluidly coupled to a reductant supply or delivery line which communicates the reductant from the pump 224 to the dosing valve 236. In various implementations, the pressure sensor 234 can be positioned within a housing of the supply unit 222, a housing of the dosing unit 232 or positioned within a separate housing dedicated to house the pressure sensor 234.

The pump 224 is fluidly coupled to the dosing valve 236 and configured to deliver the reductant at a predetermined pressure to the dosing valve 236 for insertion into the housing 202 of the aftertreatment system 200 and thereby, into the SCR catalyst 250. The dozing valve 236 includes a nozzle 237 which is in fluid communication with the housing 202 of the aftertreatment system 200 and inserts the reductant into the housing 202 at a pressure generated by the pump 224. The dosing unit 232 also includes an orifice 238 in fluid communication with the tank 210. The orifice 238 allows excess reductant to be delivered back to tank 210 from the dosing unit 232, to generate a constant cooling flow through the dosing unit and to create a minimum flow. This allows the pressure to be regulated with variabale pump speed, even if there is no dosing amount required.

The pressure sensor 234 is positioned upstream of the dosing valve 236. The pressure sensor 234 is configured to monitor a pressure of the reductant generated by the pump 224. The pressure sensor 234 produces an output value indicative of the pressure of the reductant. The output value can include, for example an output signal such as, an electrical signal (e.g., a voltage, current, capacitance, inductance etc.) corresponding to the reductant pressure or the actual numerical value of the pressure. The output signal from the pressure sensor 234 is also used to adjust an operating speed of the pump 224 to allow adjusting of the pressure at which the reductant is inserted into the housing 202 of aftertreatment system 200.

Figure 4:
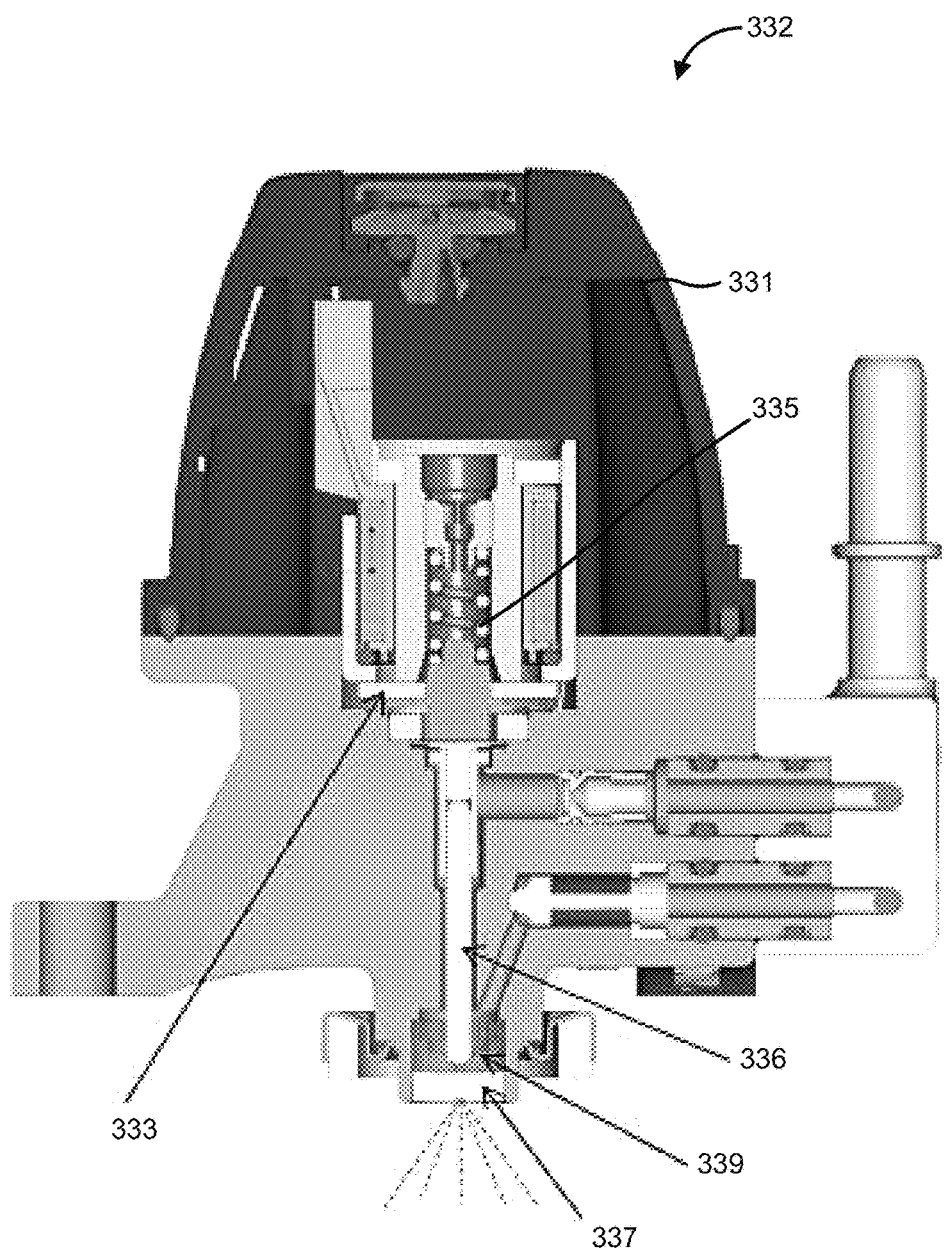
FIG. 4 is a side cross-section view of a particular embodiment of a dosing unit which can be included in the aftertreatment system of FIG. 2.

FIG. 4 is a side cross-section of one embodiment of a dosing unit 332 which can be included in the reductant insertion assembly 220. The dosing valve 236 includes a housing 331 defining an interior volume for housing the components of the dosing unit 332. The dosing unit 332 include a valve needle 336 seated in a valve seat 339. The valve needle 226 is operatively coupled to a solenoid 333. A biasing member 335 is positioned within the solenoid 333 biases the valve needle 336 towards the valve seat 339 to close an opening defined in the valve seat 339 to prevent the reductant from being delivered through the opening.

A nozzle 337 is positioned downstream of the valve seat 339. The nozzle 337 is configured to be fluidly coupled to the SCR catalyst 250 or the housing 202 of the aftertreatment system 200 and configured to deliver reductant to the aftertreatment system 200. To activate the valve needle 336, the solenoid 333 is activated so as to move the valve needle 336 distal from the valve seat 339. This allows the reductant to be pumped through the nozzle 337. The solenoid 333 can be maintained in the activated positioned for a predetermined time to allow a predetermined amount of the reductant to be delivered to the housing 202 and thereby the SCR catalyst 250 of the aftertreatment system 200.

Figure 5:
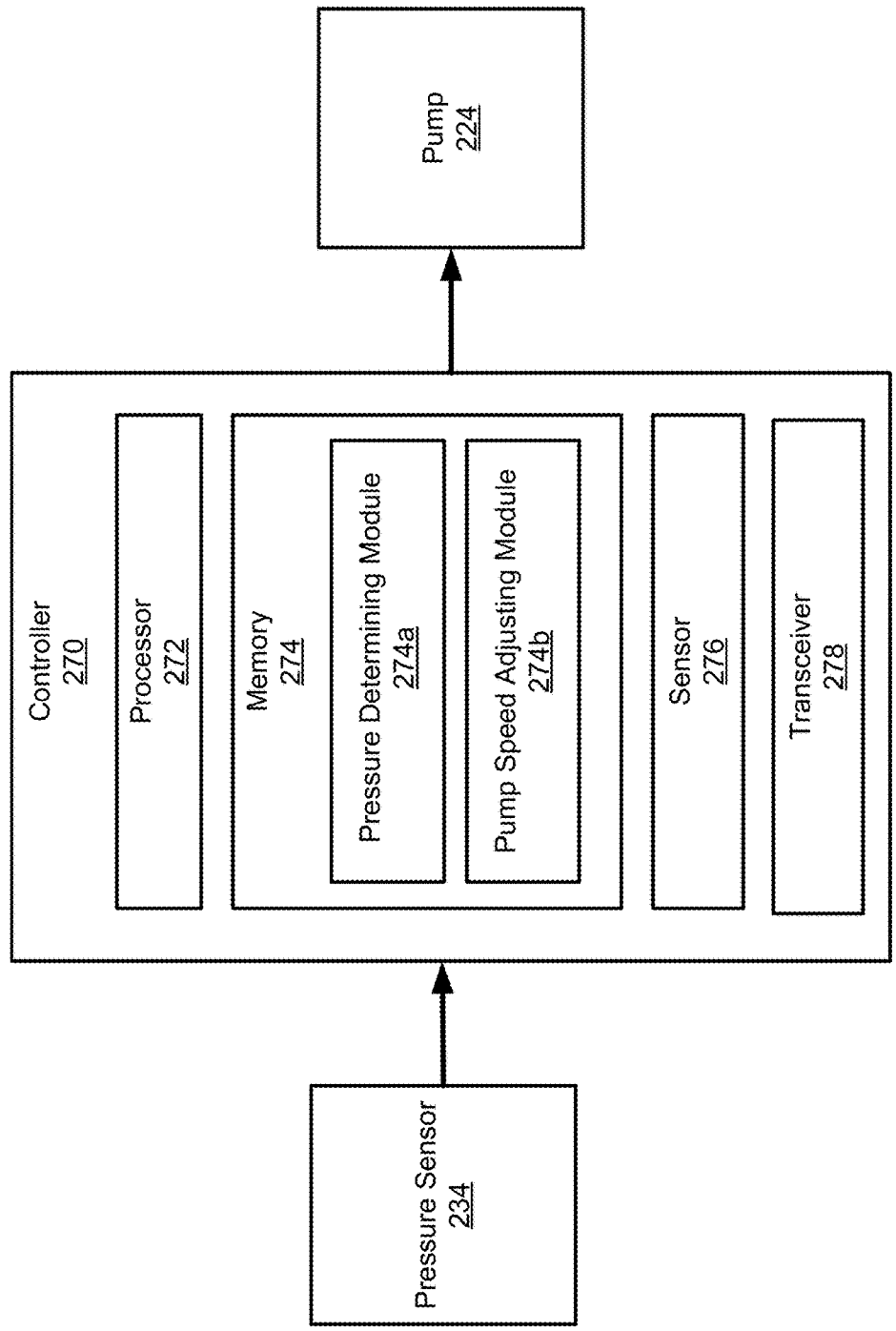
FIG. 5 is a schematic block diagram of an embodiment of a control module which can be included in the aftertreatment system of FIG. 1 or 2.
Figure 6:
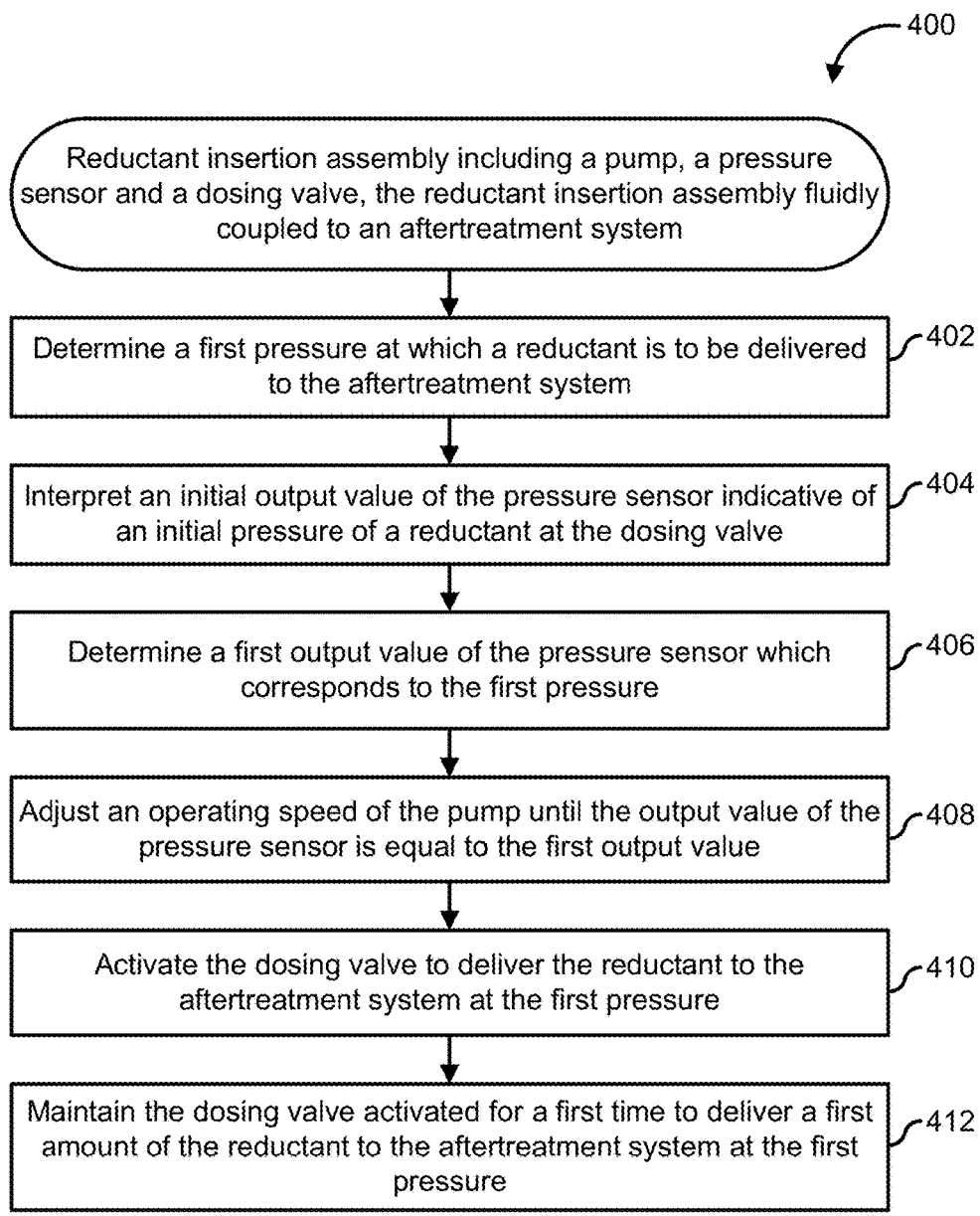
FIG. 6 is a schematic flow diagram of another embodiment of a method of varying a pressure of a reductant inserted into an aftertreatment system via a reductant insertion assembly by varying an operating speed of a pump included in the reductant insertion assembly.

Referring again to FIG. 3, a controller 270 is communicatively coupled to the reductant insertion assembly 220 and more specifically, to each of the supply unit 222 and the dosing unit 232 included in the reductant insertion assembly 220. For example, FIG. 5 is a schematic block diagram of the controller 270 according to an embodiment. The controller 270 can be included in a control module and incldues a processor 272, a memory 274 or other computer readable medium, a sensor 276 and a transceiver 278. It should be understood that only one embodiment of the controller 270 is shown, and any other controller capable of performing the operations described herein can be used (e.g., the computing device 630).

The controller 270 is configured to interpret an initial output value of the pressure sensor 234 which is indicative of an initial pressure of the reductant at the dosing valve 236.

For example, the sensor 276 can include an electrical sensor configured to receive and interpret the initial output value of the pressure sensor 234 via hardwired communication circuitry or other wireless communication. In some embodiments, the sensor 276 can sense a current and/or a voltage generated by the pressure sensor 234. The initial pressure can correspond to a pressure of the exhaust reductant generated by the pump 224 at an initial time. For example, the initial pressure can correspond to a pressure of the reductant which provides optimal mixing of the reductant with the exhaust gas during steady state flow condition of the exhaust gas.

The processor 272 can include a microprocessor, programmable logic controller (PLC) chip, an ASIC chip, or any other suitable processor. The processor 272 is in communication with the memory 274 and configured to execute instructions, algorithms, commands or otherwise programs stored in the memory 274.

Memory 274 includes any of the memory and/or storage components discussed herein. For example, memory 116 may include RAM and/or cache of processor 272. Memory 274 may also include one or more storage devices (e.g., hard drives, flash drives, computer readable media, etc.) either local or remote to device controller 270. The memory 274 is configured to store look up tables, algorithms or instructions. For example, the memory 274 includes a pressure determining module 274a configured to store instructions for determining a pressure of the reductant from the output value of the pressure sensor 234 when executed by the processor 272, based on the electrical output received by the sensor 276. The pressure determining module 274 can also be configured to determine an output value of the pressure sensor 234 based on a pressure of the reductant, for example a desired pressure of the reductant for insertion into the housing 202 of the aftertreatment system 200.

Moreover, the memory 274 also includes a pump adjusting module 274b. The pump adjusting module 274b is configured to store instructions for determining a speed of the pump 224 corresponding to an output value of the pressure sensor 234, when executed by the processor 272, based on a desired pressure of the reductant. The desired pressure can be a pressure of the reductant inserted into the housing 202 of the aftertreatment system 200 which will provide optimal mixing of the reductant with the exhaust gas a particular exhaust gas flow condition.

The controller 270 determines a first output value of the pressure sensor 234 corresponding to the first pressure. For example, the pressure determining module 274a can determine the first output value of the pressure sensor 234 from the first pressure. The first pressure can correspond to the desired insertion pressure of the reductant at which optimal mixing of the reductant with the exhaust gas as well as reduction in reductant deposits is expected.

The controller 270 also includes a transceiver 278 configured to generate a pump adjusting signal for adjusting a speed of the pump 224. For example, the pump adjusting module 274b can determine a desired pump adjusting signal for adjusting the operating speed of the pump 224 at a desired operating speed to obtain the desired pressure. The pump adjusting module 274b can communicate information corresponding to the desired pump adjusting signal to the transceiver 278 which generates the pump adjusting signal. The pump adjusting signal can include a voltage, a current or any other electrical signal for communicated to the pump 224 to adjust the operating speed of the pump 224.

The controller 270 adjusts the operating speed of the pump 224 until the output value of the pressure sensor 234 is equal to the first output value. For example, the transceiver 278 based on information received from the pump adjusting module 274b varies the operating voltage of the pump 224 to reduce or increase the speed until the pressure of the reductant as measured by the pressure sensor 234 is the same or otherwise substantially the same (i.e., within ±90% of the first pressure). The controller 270 then activates the dosing valve 236 which results in an at least selective delivery of the reductant to the housing 202 of the aftertreatment system 200 at the first pressure.

In some embodiments, the controller 270 is further configured to maintain the dosing valve 236 activated for a first time so as to deliver a first amount of reductant to the housing 202 of the aftertreatment system 200. In other words, the controller 270 maintains the dosing valve 236 open until the first amount of the reductant is delivered to the housing 202 of the aftertreatment system 200 at the first pressure. The operating speed of the pump 224, and thereby, the insertion pressure of the reductant can be varied over numerous cycles.

For example, the controller 270 can be configured to determine a second pressure at which the reductant is to be delivered to the aftertreatment system 200. The second pressure is different from the first pressure. Expanding further, the controller 270 can determine a change in the operating flow condition of the exhaust gas from the first flow condition (e.g., a low load flow condition) to a second flow condition (e.g., a high load flow condition). The controller 270 can then determine the second pressure at which the reductant is inserted into the housing 202 will cause optimal mixing of the reductant with the exhaust gas, thereby reducing reductant deposits.

The controller 270 determines a second output value of the pressure sensor 234 corresponding to the second pressure. For example, the controller 270 can determine a voltage, a current, a capacitance, an inductance or any other output value or otherwise output signal of the pressure sensor 234 which corresponds to the second pressure. The controller 270 can include lookup tables, algorithms, pressure/output signal curves or maps to determine the second output value which corresponds to the second pressure.

The controller 270 adjusts the operating speed of the pump 224 until the output value of the pressure sensor 234 is equal to the second output value, thereby adjusting pressure of the reductant to the desired pressure. The controller 270 activates the dosing valve 236 which results in an at least selective delivery of the reductant into the housing 202 at the second pressure. The controller 270 can maintain the dosing valve 236 activated for a second time to allow a second amount of reductant to be delivered to the housing 202 of the aftertreatment system 200 and thereby, the SCR system 250.

FIG. 3 is a schematic flow diagram of an example method 400 of delivering a reductant to an aftertreatment system (e.g., the aftertreatment system 100 or 200) using a reductant insertion assembly (e.g., the reductant insertion assembly 120 or 220) fluidly coupled to the aftertreatment system. The reductant insertion assembly includes a pump (e.g., the pump 224), a pressure sensor (e.g., the pressure sensor 234) and a dosing valve (e.g., the dosing valve 236). The operations of the method 200 can be stored in the form of instructions on a non-transitory CRM (e.g., the memory 274 of the controller 270, or main memory 636, read only memory (ROM) 638 or storage device 640 included in the computing device 630 of FIG. 7). The CRM can be included in a computing device (e.g., the computing device 630)

which is configured to execute the instructions stored on the CRM to perform the operations of the method 400.

The method 400 includes determining a first pressure at which a reductant is delivered to the aftertreatment system at 402. For example, the controller 170 or 270 can determine a first pressure at which the reductant is to be delivered to the aftertreatment system 100 or 200 based on a flow condition (e.g., flow rate and/or temperature) of the exhaust gas flowing through the aftertreatment system 100 or 200, as described before. In various embodiments, the first pressure is in the range of 6 bar to 14 bar.

An initial output value of the pressure sensor is interpreted at 404. The initial output value is indicative of an initial pressure of the reductant at the dosing valve. For example, the controller 170 or 270 can interpret an initial output signal of the pressure sensor (e.g., the pressure sensor 234) to determine the initial pressure of the reductant at the dosing valve (e.g., the dosing valve included in the dosing unit 132, or the dosing valve 236 or 336).

A first output value of the pressure sensor is determined which corresponds to the first pressure at 406. For example, the controller 170 or 270 (e.g., the pressure determining module 274a included in the controller 270) can determine what the first output value (e.g., an electrical signal such as a voltage, current, capacitance, inductance, etc.) should be which corresponds to the first pressure.

An operating speed of the pump is adjusted until the output value of the pressure sensor is equal to the first output value at 408. For example, the controller 170 or 270 can communicate instructions to the pump (e.g., the pump included in the supply unit 122 or the pump 224) configured to adjust the operating speed of the pump until the pressure sensor (e.g., the pressure sensor included in the dosing unit 132 or the pressure sensor 234) generates the first output value. This is indicative that the reductant is being communicated by the pump to the dosing unit at the first pressure.

The dosing valve is activated which results in an at least selective delivery of the reductant to the aftertreatment system at the first pressure at 410. For example, the controller 170 or 270 activates the dosing valve included in the dosing unit 132 or the dosing valve 236 so that the fluid is delivered to the aftertreatment system (e.g., the SCR system 150 or 250) at the first pressure. In various embodiments, the dosing valve can be maintained in the activated position for a first time to deliver a first amount of reductant to the aftertreatment system at the first pressure at 412.

In other embodiments, the method 400 can also include determining a second pressure at which the reductant is to be delivered to the aftertreatment system. The second pressure is different from the first pressure (e.g., a higher or lower pressure to generate high momentum reductant droplets corresponding to a high load flow condition of the exhaust gas, or a higher or lower pressure configured to generate low momentum reductant droplets corresponding to a low load flow condition of the exhaust gas). A second output value of the pressure sensor is determined which corresponds to the second pressure, as described before. The operating speed of the pump is adjusted until the output value of the pressure sensor is equal to the second output value. The dosing valve is activated resulting in an at least selective delivery of the reductant to the aftertreatment system at the second pressure.

Figure 7:
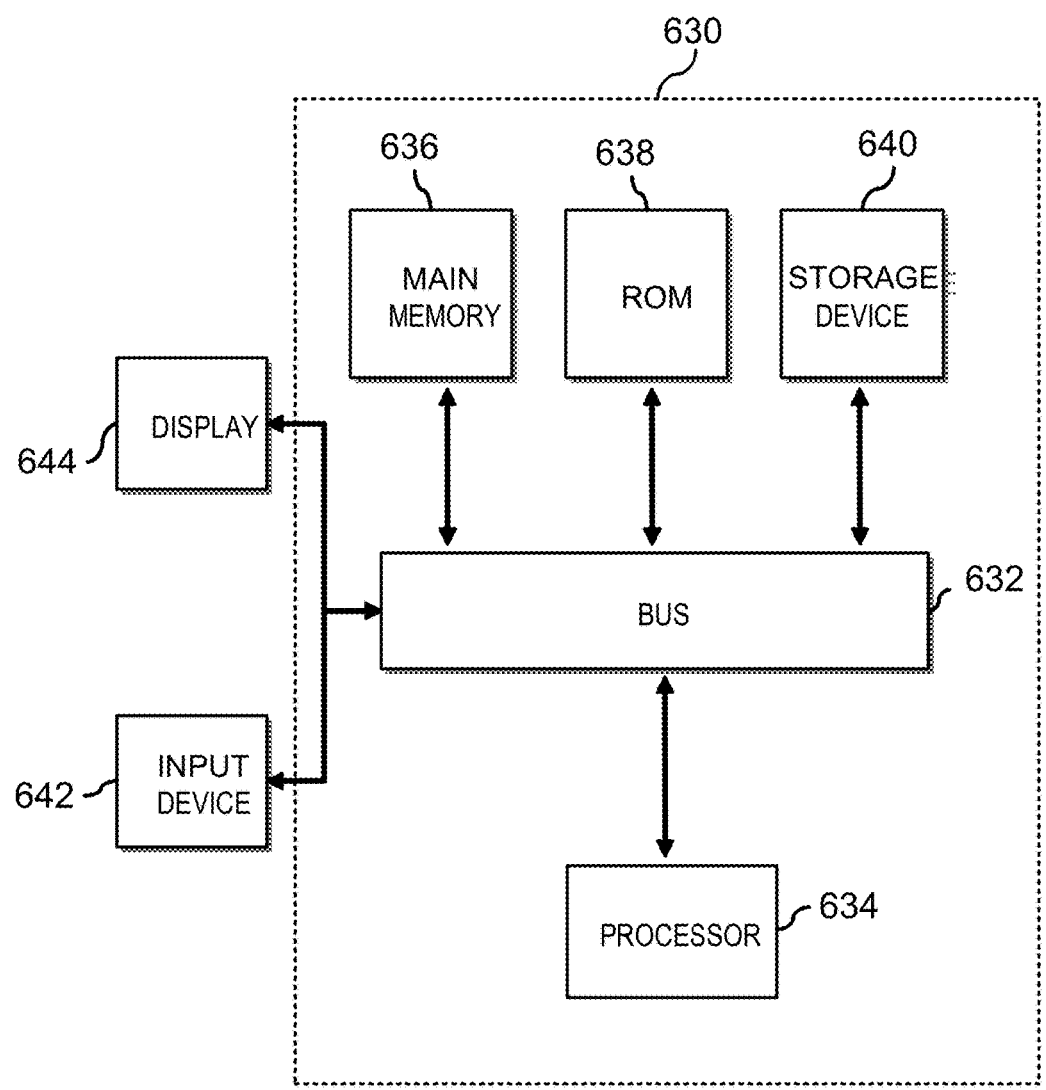
FIG. 7 is a schematic block diagram of an embodiment of a computing device which can be used as a controller included in the aftertreatment systems of FIG. 1 or FIG. 2.

In some embodiments, the controller 170, 270 or any of the controllers described herein can be a system computer of an apparatus or system which includes the aftertreatment system 100 or 200 (e.g., a vehicle, an engine or generator set, etc.). For example, FIG. 7 is a block diagram of a computing device 630 in accordance with an illustrative implementation. The computing device 630 can be used to perform any of the methods or the processes described herein, for example the method 400. In some embodiments, the controller 170 or 270 can include the computing device 630. The computing device 630 includes a bus 632 or other communication component for communicating information. The computing device 630 can also include one or more processors 634 or processing circuits coupled to the bus for processing information.

The computing device 630 also includes main memory 636, such as a random access memory (RAM) or other dynamic storage device, coupled to the bus 632 for storing information, and instructions to be executed by the processor 634. Main memory 636 can also be used for storing position information, temporary variables, or other intermediate information during execution of instructions by the processor 634. The computing device 630 may further include a read only memory (ROM) 638 or other static storage device coupled to the bus 632 for storing static information and instructions for the processor 634. A storage device 640, such as a solid-state device, magnetic disk or optical disk, is coupled to the bus 640 for persistently storing information and instructions. For example instructions for determining the initial pressure, the first pressure, the second pressure and/or the output value of the pump corresponding to an insertion pressure of the reductant.

The computing device 630 may be coupled via the bus 632 to a display 635, such as a liquid crystal display, or active matrix display, for displaying information to a user. An input device 642, such as a keyboard or alphanumeric pad, may be coupled to the bus 632 for communicating information and command selections to the processor 634. In another implementation, the input device 642 has a touch screen display 644.

According to various implementations, the processes and methods described herein can be implemented by the computing device 630 in response to the processor 634 executing an arrangement of instructions contained in main memory 636 (e.g., the operations of the method 400). Such instructions can be read into main memory 636 from another non-transitory computer-readable medium, such as the storage device 640. Execution of the arrangement of instructions contained in main memory 36 causes the computing device 730 to perform the illustrative processes described herein. One or more processors in a multi-processing arrangement may also be employed to execute the instructions contained in main memory 636. In alternative implementations, hardwired circuitry may be used in place of or in combination with software instructions to effect illustrative implementations. Thus, implementations are not limited to any specific combination of hardware circuitry and software.

Although an example computing device has been described in FIG. 7, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system, comprising:
   a reductant storage tank;

a selective catalytic reduction system including a catalyst for reducing constituents of an exhaust gas;
a reductant insertion assembly comprising:
   a supply unit comprising a pump that is fluidly coupled to the reductant storage tank, and
   a dosing unit comprising a pressure sensor, and a dosing valve that is fluidly coupled to the selective catalytic reduction system, the dosing unit positioned downstream of the supply unit and separate from the supply unit; and
a controller communicatively coupled to the supply unit and the dosing unit, the controller configured to:
   determine an initial pressure of the reductant, the initial pressure corresponding to a first flow condition of the exhaust gas,
   determine a first pressure, different from the initial pressure, at which the reductant is to be delivered to the selective catalytic reduction system, the first pressure corresponding to a second flow condition of the exhaust gas that is different from the first flow condition, and
   when a flow condition of the exhaust gas changes from the first flow condition to the second flow condition, adjust an operating parameter of the reductant insertion assembly to deliver the reductant to the selective catalytic reduction system at the corresponding first pressure, by performing steps comprising:
      interpreting an initial output value of the pressure sensor indicative of the initial pressure of the reductant at the dosing valve,
      determining a first output value of the pressure sensor corresponding to the first pressure,
      obtaining a sensed output value of the pressure sensor,
      adjusting the operating parameter of the pump until the sensed output value of the pressure sensor is equal to the first output value,
      after the sensed output value of the pressure sensor is equal to the first output value, activating the dosing valve, the activating of the dosing valve resulting in an at least selective delivery of the reductant to the selective catalytic reduction system at the first pressure, and
      maintaining the dosing valve activated for a first time so as to deliver a first amount of reductant to the aftertreatment system.

2. The aftertreatment system of claim 1, wherein the operating parameter is an operating speed of the pump.

3. The aftertreatment system of claim 1, wherein the controller is further configured to:
   determine a second pressure at which the reductant is to be delivered to the aftertreatment system, the second pressure different from the first pressure;
   determine a second output value of the pressure sensor corresponding to the second pressure;
   adjust the operating parameter of the pump until the sensed output value of the pressure sensor is equal to the second output value; and
   activate the dosing valve, the activating of the dosing valve resulting in an at least selective delivery of the reductant to the selective catalytic reduction system at the second pressure.

4. The aftertreatment system of claim 1, wherein the supply unit further comprises a pressure relief valve configured to allow at least a portion of the reductant from downstream of the pump to flow upstream of the pump if a reductant pressure generated by the pump exceeds a predetermined threshold.

5. The aftertreatment system of claim 1, wherein the first pressure is in the range of 6 bar to 14 bar.

6. The aftertreatment system of claim 1, where in the dosing unit further comprises an orifice in fluid communication with the reductant storage tank, the orifice allowing excess reductant to be delivered back to the reductant storage tank from the dosing unit.

7. The aftertreatment system of claim 1, wherein the dosing valve comprises:
   a solenoid;
   a valve needle seated in a valve seat; and
   a nozzle,
   wherein activating the dosing valve includes activating the solenoid so as to move the valve needle distal from the valve seat so that the reductant can be pumped through the nozzle.

8. A system for controlling the pressure of a reductant delivered to a selective catalytic reduction system from a reductant storage tank, comprising:
   a reductant insertion assembly comprising:
      a supply unit comprising a pump configured to be fluidly coupled to the reductant storage tank, and
      a dosing unit comprising a pressure sensor, and a dosing valve configured to be fluidly coupled to the selective catalytic reduction system, the dosing unit positioned downstream of the supply unit and separate from the supply unit; and
   a controller communicatively coupled to the supply unit and the dosing unit, the controller configured to:
      determine an initial pressure of the reductant, the initial pressure corresponding to a first flow condition of the exhaust gas,
      determine a first pressure, different from the initial pressure, at which the reductant is to be delivered to the selective catalytic reduction system, the first pressure corresponding to a second flow condition of the exhaust gas that is different from the first flow condition, and
      when a flow condition of the exhaust gas changes from the first flow condition to the second flow condition, adjust an operating parameter of the reductant insertion assembly to deliver the reductant to the selective catalytic reduction system at the corresponding first pressure, by performing steps comprising:
         interpreting an initial output value of the pressure sensor indicative of the initial pressure of the reductant at the dosing valve,
         determining a first output value of the pressure sensor corresponding to the first pressure,
         obtaining a sensed output value of the pressure sensor,
         adjusting the operating parameter of the pump until the sensed output value of the pressure sensor is equal to the first output value,
         after the sensed output value of the pressure sensor is equal to the first output value, activating the dosing valve, the activating of the dosing valve resulting in an at least selective delivery of the reductant to the selective catalytic reduction system at the first pressure, and
         maintaining the dosing valve activated for a first time so as to deliver a first amount of reductant to the aftertreatment system.

9. The system of claim 8, wherein the operating parameter is an operating speed of the pump.

10. The system of claim 8, wherein the controller is further configured to:
   determine a second pressure at which the reductant is to be delivered to the aftertreatment system, the second pressure different from the first pressure;
   determine a second output value of the pressure sensor corresponding to the second pressure;
   adjust the operating parameter of the pump until the sensed output value of the pressure sensor is equal to the second output value; and
   activate the dosing valve, the activating of the dosing valve resulting in an at least selective delivery of the reductant to the selective catalytic reduction system at the second pressure.

11. The system of claim 8, wherein the first pressure is in the range of 6 bar to 14 bar.

12. The system of claim 8, wherein the supply unit further comprises a pressure relief valve configured to allow at least a portion of the reductant from downstream of the pump to flow upstream of the pump if a reductant pressure generated by the pump exceeds a predetermined threshold.

13. The system of claim 8, wherein the dosing unit further comprises an orifice in fluid communication with the reductant storage tank, the orifice allowing excess reductant to be delivered back to the reductant storage tank from the dosing unit.

14. The system of claim 8, wherein the dosing valve comprises:
   a solenoid;
   a valve needle seated in a valve seat; and
   a nozzle,
   wherein activating the dosing valve includes activating the solenoid so as to move the valve needle distal from the valve seat so that the reductant can be pumped through the nozzle.

15. A method of delivering a reductant to an aftertreatment system, the method comprising:
   providing a reductant storage tank;
   providing a selective catalytic reduction system including a catalyst for reducing constituents of an exhaust gas;
   providing a reductant insertion assembly comprising:
      a supply unit comprising a pump that is fluidly coupled to the reductant storage tank, and
      a dosing unit comprising a pressure sensor, and a dosing valve that is fluidly coupled to the selective catalytic reduction system, the dosing unit positioned downstream of the supply unit and separate from the supply unit;
   determining an initial pressure of the reductant, the initial pressure corresponding to a first flow condition of the exhaust gas,
   determining a first pressure, different from the initial pressure, at which the reductant is to be delivered to the selective catalytic reduction system, the first pressure corresponding to a second flow condition of the exhaust gas that is different from the first flow condition, and
   when a flow condition of the exhaust gas changes from the first flow condition to the second flow condition, adjusting an operating speed of the reductant insertion assembly to deliver the reductant to the selective catalytic reduction system at the corresponding first pressure, by performing steps comprising:
      interpreting an initial output value of the pressure sensor indicative of the initial pressure of the reductant at the dosing valve,
      determining a first output value of the pressure sensor corresponding to the first pressure,
      obtaining a sensed output value of the pressure sensor,
      adjusting the operating speed of the pump until the sensed output value of the pressure sensor is equal to the first output value,
      after the sensed output value of the pressure sensor is equal to the first output value, activating the dosing valve, the activating of the dosing valve resulting in an at least selective delivery of the reductant to the selective catalytic reduction system at the first pressure, and
      maintaining the dosing valve activated for a first time so as to deliver a first amount of reductant to the aftertreatment system.

16. The method of claim 15, further comprising:
   determining a second pressure at which the reductant is to be delivered to the aftertreatment system, the second pressure different from the first pressure;
   determining a second output value of the pressure sensor, the second output value corresponding to the second pressure;
   adjusting the operating speed of the pump until the sensed output value of the pressure sensor is equal to the second output value; and
   activating the dosing valve, the activating of the dosing valve resulting in an at least selective delivery of the reductant to the aftertreatment system at the second pressure.

17. The method of claim 15, wherein the first pressure is in the range of 6 bar to 14 bar.

18. A controller configured to be communicatively coupled to a reductant insertion assembly that comprises a supply unit comprising a pump that is fluidly coupled to a reductant storage tank, and a dosing unit comprising a pressure sensor and positioned downstream of the supply unit and separate from the supply unit, and a dosing valve that is fluidly coupled to a selective catalytic reduction system including a catalyst for reducing constituents of an exhaust gas, the controller comprising:
   a pressure determining module configured to:
      determine an initial pressure of the reductant, the initial pressure corresponding to a first flow condition of the exhaust gas, and
      determine a first pressure, different from the initial pressure, at which the reductant is to be delivered to the selective catalytic reduction system, the first pressure corresponding to a second flow condition of the exhaust gas that is different from the first flow condition; and
   an adjusting module configured to, when a flow condition of the exhaust gas changes from the first flow condition to the second flow condition, adjust an operating speed of the reductant insertion assembly to deliver the reductant to the selective catalytic reduction system at the corresponding first pressure, by performing steps comprising:
      interpreting an initial output value of the pressure sensor indicative of the initial pressure of the reductant at the dosing valve,
      determining a first output value of the pressure sensor corresponding to the first pressure,
      obtaining a sensed output value of the pressure sensor,
      adjusting the operating speed of the pump until the sensed output value of the pressure sensor is equal to the first output value, after the sensed output value of the pressure sensor is equal to the first output value, activating the dosing valve, the activating of the dosing valve resulting in an at least selective delivery of the reductant to the selective catalytic reduction system at the first pressure, and maintaining the dosing valve activated for a first time so as to deliver a first amount of reductant to the aftertreatment system.

* * * * *